United States Patent
Yue et al.

(10) Patent No.: US 11,974,583 B2
(45) Date of Patent: May 7, 2024

(54) METHOD FOR PREPARING TIBETAN KEFIR GRAIN AND GYNOSTEMMA PENTAPHYLLUM FERMENTATION MILK WITH BLOOD PRESSURE LOWERING EFFECT

(71) Applicant: Northwest University, Shaanxi (CN)

(72) Inventors: Tianli Yue, Shaanxi (CN); Xiaoyu Ma, Shaanxi (CN); Chen Niu, Shaanxi (CN); Zhengcao Xiao, Shaanxi (CN); Yuan Wang, Shaanxi (CN)

(73) Assignee: Northwest University, Shaanxi (CN)

( * ) Notice: Subject to any disclaimer, the term of this patent is extended or adjusted under 35 U.S.C. 154(b) by 0 days.

(21) Appl. No.: 18/263,200

(22) PCT Filed: Jul. 14, 2022

(86) PCT No.: PCT/CN2022/105655
§ 371 (c)(1),
(2) Date: Jul. 27, 2023

(87) PCT Pub. No.: WO2023/035769
PCT Pub. Date: Mar. 16, 2023

(65) Prior Publication Data
US 2023/0413836 A1    Dec. 28, 2023

(30) Foreign Application Priority Data
Sep. 10, 2021   (CN) .......................... 202111060052.4

(51) Int. Cl.
A23C 9/12        (2006.01)
A23C 9/133       (2006.01)

(52) U.S. Cl.
CPC ............ *A23C 9/1203* (2013.01); *A23C 9/133* (2013.01)

(58) Field of Classification Search
CPC .................................................... A23C 9/1203
USPC ............................................................ 426/61
See application file for complete search history.

(56) References Cited

U.S. PATENT DOCUMENTS

2019/0000905 A1    1/2019  Moon et al.

FOREIGN PATENT DOCUMENTS

| CN | 104920609 A | * | 9/2015 |
| CN | 104920609 A |   | 9/2015 |
| CN | 104938623 A |   | 9/2015 |
| CN | 105660854 A |   | 6/2016 |
| CN | 106070623 A |   | 11/2016 |
| CN | 108477352 A |   | 9/2018 |

(Continued)

OTHER PUBLICATIONS

Translation of CN-104920609-A (Year: 2015).*

(Continued)

*Primary Examiner* — Brent T O'Hern
(74) *Attorney, Agent, or Firm* — LADAS & PARRY LLP (57) ABSTRACT

Disclosed is a method for fermenting *Gynostemma pentaphyllum* with antihypertensive effect, the method comprising the following steps: 1) pretreatment of *Gynostemma pentaphyllum*: crushing *Gynostemma pentaphyllum* raw tea to prepare a homogenate; 2) activation of Tibetan Kefir: activating Tibetan Kefir in sterile milk; and 3) fermentation of *Gynostemma pentaphyllum*: taking the homogenate of *Gynostemma pentaphyllum*, the sterile milk and the activated Tibetan Kefir for fermentation.

7 Claims, 5 Drawing Sheets

(56) References Cited

FOREIGN PATENT DOCUMENTS

| CN | 111248265 A | 6/2020 |
|---|---|---|
| CN | 113826691 A | 12/2021 |

OTHER PUBLICATIONS

First Office Action for copending application 202111060052.4 dated Nov. 24, 2022.
Notification to Grant Patent Right for Invention for copending application 202111060052.4 dated Dec. 30, 2022.
International Search Report dated Sep. 20, 2022 for Application No. PCT/CN2022/105655.
Written Opinion dated Sep. 20, 2022 for Application No. PCT/CN2022/105655.
Liang, Xiaohui et al., Anti-hypertensive Effect of Gpenosides in High-glucose-and-Fat-induced Hypertension in Rats, Lishizhen Medicine and Materia Medica Research, vol. 23, No. 10.Dec. 31, 2012(Dec. 31, 2012), pp. 2417-2419.
Wang, Juntang et al., Clinical observation on Jiaogulan in treating diabetes and hypertension, Shandong Pharmaceutical Industry, vol. 8, No. 1.Dec. 31, 1999(Dec. 31, 1999), pp. 53-54.
Zheng, Yi et al., Advances in Research on Bioactivity and Biotransformation of Gypenoside, Food Science, vol. 39, No. 13.Dec. 31, 2018(Dec. 31, 2018), pp. 324-333.
First Search for Chinese Application No. 202111060052, dated Nov. 17, 2022, 2 pages.
Supplemental Search for Chinese Application No. 202111060052, dated Dec. 14, 2022, 3 pages.

* cited by examiner

METHOD FOR PREPARING TIBETAN KEFIR GRAIN AND GYNOSTEMMA PENTAPHYLLUM FERMENTATION MILK WITH BLOOD PRESSURE LOWERING EFFECT

CROSS-REFERENCE TO RELATED APPLICATION

This application is an application under 35 U.S.C. 371 of International Application No. PCT/CN2022/105655 filed on Jul. 14, 2022, which claims the priority of the Chinese patent application 202111060052.4 filed on Sep. 10, 2021, the entire contents of which are incorporated by reference herein.

TECHNICAL FIELD

The present invention belongs to the field of microbial fermentation, and specifically relates to a method for fermenting *Gynostemma pentaphyllum* with Tibetan Kefir with antihypertensive effect.

BACKGROUND ART

*Gynostemma pentaphyllum* (*Gynostemma pentaphyllum* (*Thunb.*) *Makino*) is an herbaceous climbing plant in the Cucurbitaceae and genus *Gynostemma*. Stem slender, branched, with longitudinal ribs and grooves, glabrous or sparsely pubescent. Cold in nature and bitter in taste, it has the effects of clearing heat and detoxifying, relieving cough, clearing lung and phlegm, nourishing the heart and calming the mind, nourishing qi and generating essence. It can be used to lower blood pressure, lower blood lipids, protect the liver, promote sleep, and treat gastroenteritis, tracheitis, and pharyngitis. It is also used as an auxiliary anticancer clinical treatment for various cancers.

Rich in *Gynostemma pentaphyllum* saponins which is an active substance with hypotensive activity, *Gynostemma pentaphyllum* is considered a functional food that can improve hypertension. But currently, *Gynostemma pentaphyllum* is mainly consumed through tea, lacking further processed products. At the same time, the bitter taste of *Gynostemma pentaphyllum* tea also limits the consumer audience, and there is currently little in-depth research on its fermentation.

Tibetan Kefir, also known as Tibetan Kefir Grain, is a milky white or light yellow gelatinous block that grows irregularly in shape, mostly in the form of spherical rice grains. The surface curls can quickly grow in milk, forming cauliflower like bacterial clumps with elasticity and a sticky feeling when pinched, similar to the appearance of snow lotus, hence it is also known as "Tibet Snow Lotus". The fermented products of Tibetan Kefir have the function of lowering blood pressure and health care, while the fermentation of Tibetan Kefir also endows dairy products with a sweet and pleasant taste, which has a good market acceptance.

For the two functional foods with antihypertensive activity, *Gynostemma pentaphyllum* and Tibetan Kefir, there is no precedent for combining them for deep processing to obtain new antihypertensive foods.

In view of this, the present invention is proposed.

SUMMARY OF THE INVENTION

The purpose of the present invention is to seek a novel fermentation method for *Gynostemma pentaphyllum* to prepare fermented dairy products with higher hypotensive activity. In the experiment, the applicant unexpectedly discovered that *Gynostemma pentaphyllum* can be effectively fermented in milk using Tibetan Kefir. Importantly, the fermented milk of *Gynostemma pentaphyllum* has significantly increased hypotensive activity. Based on this, the present invention is proposed. The present invention specifically provides the following technical solution.

Firstly, the present invention provides a method for fermenting *Gynostemma pentaphyllum* with Tibetan Kefir, comprising the following steps:
1) pretreatment of *Gynostemma pentaphyllum*: crushing *Gynostemma pentaphyllum* raw tea to prepare a homogenate;
2) activation of Tibetan Kefir: activating Tibetan Kefir in sterile milk;
3) fermentation of *Gynostemma pentaphyllum*: fermenting the homogenate of *Gynostemma pentaphyllum*, sterile milk, and the activated Tibetan Kefir for fermentation.

Further, in step 3), the homogenate of *Gynostemma pentaphyllum* and the sterile milk are mixed in a ratio of 0.3~1:1, and the Tibetan Kefir is inoculated in a mass ratio of 1:50~200. The fermentation temperature is 23~34° C., and the fermentation time is 22~35 hours.

Further, step 3) comprises: mixing the homogenate of *Gynostemma pentaphyllum* and the sterile milk in a ratio of 0.3~1:1, and placing the mixed solution in a fermentation vessel; inoculating the activated Tibetan Kefir in a mass ratio of 1:50-200 with the mixed solution in the fermentation vessel, and vibrating and fermenting at 23~34° C. for 22~35 hours.

More further, step 3) specifically comprises: mixing the homogenate of *Gynostemma pentaphyllum* and the sterile milk in a ratio of 0.65:1, and placing the mixed solution in a fermentation vessel; adding the activated Tibetan Kefir to the mixed solution in the fermentation vessel, and vibrating and fermenting at 28° C. for 28 hours.

Further, step 1) comprises: crushing the *Gynostemma pentaphyllum* raw tea and homogenizing it with 5~10 times the volume of water at 40~45° C. for 0.5~2 hours, and filtering for later use.

More further, step 1) comprises: crushing the *Gynostemma pentaphyllum* raw tea and homogenizing it with 10 times the volume of water at 45° C. for 1 hour, and filtering for later use.

Further, the *Gynostemma pentaphyllum* raw tea is made from fresh leaves of *Gynostemma pentaphyllum*, which are cleaned and dried, then blanched, kneaded, and baked to produce *Gynostemma pentaphyllum* raw tea.

Further, step 2) comprises: taking the Tibetan Kefir, vibrating and fermenting it in the sterile milk, and continuously cultivating for 5~8 days until the strain is fully activated.

Further, step 2) comprises: taking the Tibetan Kefir, vibrating and fermenting it in the sterile milk at 26~28° C., filtering and transferring the mycelium of Tibetan Kefir to new milk once every 20~26 hours (preferably 24 hours), and cultivating for 5~8 days until the strain is fully activated.

The present invention also provides a fermented milk of *Gynostemma pentaphyllum*, which is prepared by using the above methods for fermenting.

The present invention also provides a food composition comprising the above-mentioned fermented milk of *Gynostemma pentaphyllum*.

The present invention also provides an application of Tibetan Kefir in preparing fermented milk of *Gynostemma pentaphyllum* by fermentation.

Further, the fermentation involves mixing and fermenting the homogenate of *Gynostemma pentaphyllum*, the milk, and the Tibetan Kefir.

More further, the fermentation involves the aforementioned fermentation steps.

Compared with the prior art, the present invention has at least the following advantages:

1) The method of the present invention first uses Tibetan Kefir for the fermentation of *Gynostemma pentaphyllum*, and the fermented product has a blood pressure reducing effect that almost reaches the level of the antihypertensive drug captopril, exceeding experimental expectations.

2) The method of the present invention optimizes the entire fermentation conditions to obtain the most suitable fermentation parameters and fermentation system for reducing blood pressure.

3) The *Gynostemma pentaphyllum* milk prepared by the present invention has significant hypotensive effects and can be prepared into various product forms, such as fermented drinks, suitable for industrial promotion.

DESCRIPTION OF THE DRAWINGS

In order to provide a clearer explanation of the specific embodiments of the present invention or the technical solutions in the prior art, a brief introduction will be given to the accompanying drawings required for the specific embodiments or the description of the prior art. It is evident that the accompanying drawings in the following description are some embodiments of the present invention. For ordinary technical personnel in the art, other accompanying drawings can be obtained based on these drawings without any creative effort.

BEST MODE FOR CARRYING OUT THE INVENTION

The following will provide a clear and complete description of the technical solution of the present invention in conjunction with the accompanying drawings. It is evident that the described embodiments are part of the embodiments of the present invention, not all of them. Based on the embodiments in the present invention, all other embodiments obtained by ordinary technicians in the art without creative labor fall within the scope of protection of the present invention.

The following terms or definitions are provided solely to assist in understanding the present invention. These definitions should not be understood as having a scope smaller than that understood by those skilled in the art.

Unless otherwise defined in the following text, the meanings and intentions of all technical and scientific terms used in the specific embodiments of the present invention are the same as those commonly understood by those skilled in the art. Although it is believed that the following terms are well understood by those skilled in the art, the following definitions are still elaborated to better explain the present invention.

As used in the present invention, the terms "including", "including", "having", "containing", or "involving" are inclusive or open-ended, and do not exclude other elements or method steps that are not listed. The term "composed of" is considered a preferred embodiment of the term "containing". If a group is defined in the following text as containing at least a certain number of implementation schemes, it should also be understood as revealing a group preferably composed solely of these implementation schemes.

The indefinite or definite article used when referring to singular nouns, such as "a" or "an", "described", includes the plural form of the noun.

The terms "approximately" and "roughly" in the present invention represent an accuracy range that can be understood by those skilled in the art and still guarantee the technical effectiveness of the features discussed. This term typically represents a deviation of ±10% from the indicated value, preferably ±5%.

In addition, the terms first, second, third, (a), (b), (c), and the like in the specification and claims are used to distinguish similar elements and are not necessary for describing order or temporal order. It should be understood that the terms used in this way are interchangeable in appropriate environments, and the embodiments described in the present invention can be implemented in a different order than those described or illustrated in the present invention.

The method for fermenting *Gynostemma pentaphyllum* with Tibetan Kefir described in the present invention is generally as follows:

1) pretreatment of *Gynostemma pentaphyllum*: crushing *Gynostemma pentaphyllum* raw tea to prepare a homogenate; 2) activation of Tibetan Kefir: activating Tibetan Kefir it in sterile milk; and 3) fermentation of *Gynostemma pentaphyllum*: fermenting the homogenate of *Gynostemma pentaphyllum*, sterile milk, and the activated Tibetan Kefir.

It can be understood that the core of the present invention is to find a new fermentation mode of *Gynostemma pentaphyllum*, that is, milk activated Tibetan Kefir can effectively ferment *Gynostemma pentaphyllum* and produce fermented milk with high antihypertensive activity. Therefore, there is no limitation, and any method for fermenting *Gynostemma pentaphyllum* with Tibetan Kefir is within the scope of the present invention.

In some embodiments, the pretreatment step of *Gynostemma pentaphyllum* in the present invention is as follows: crushing *Gynostemma pentaphyllum* raw tea and homogenize it with 5~10 times the volume of water at 40~45° C. for 0.5-2 hours, and filtering for later use.

According to the optimal embodiment of the present invention, step 1) is as follows: crushing the *Gynostemma pentaphyllum* raw tea and homogenize it with 10 times the volume of water at 45° C. for 1 hour, and filtering for later use. In the above embodiment, the pretreatment effect of *Gynostemma pentaphyllum* is the best, but this optimal embodiment does not limit the scope of the present invention, and other pretreatments can also meet the needs of the present invention.

The above-mentioned *Gynostemma pentaphyllum* raw tea can be obtained from various sources in the art. In some embodiments, it comes from fresh leaves of *Gynostemma pentaphyllum*, which are cleaned and dried, and then processed into *Gynostemma pentaphyllum* raw tea through blanching, kneading, and baking.

In some embodiments, the activation of Tibetan Kefir described in the present invention is as follows: taking the Tibetan Kefir, vibrating and fermenting it in the sterile milk at a certain temperature, and continuously cultivating for 5~8 days until the strain is fully activated.

In some preferred embodiments, the activation of the Tibetan Kefir is as follows: taking the Tibetan Kefir, vibrating and fermenting it in sterile milk at 26~28° C., filtering and transferring the mycelium of Tibetan Kefir to new milk once every 20~26 hours (preferably 24 hours), and continue cultivating for no more than 8 days until the strain is fully activated.

According to the most preferred embodiment of the present invention, a certain amount of Tibetan Kefir is taken, and vibrated and fermented in the sterile milk at 28° C. The mycelium of Tibetan Kefir is filtered and transferred to new milk once every 24 hours, and then continuously cultivated for 5~8 days until the strain is fully activated. The most preferred embodiment can obtain the Tibetan Kefir with the most vigorous metabolic activity, but it does not limit to the present invention. The Tibetan Kefir prepared by other embodiments can also be used for fermentation of *Gynostemma pentaphyllum*.

In some embodiments, in the fermentation of *Gynostemma pentaphyllum* described in the present invention, the specific homogenate of *Gynostemma pentaphyllum* and the sterile milk can be mixed in a certain proportion, such as in a ratio of 0.3~4:1. The Tibetan Kefir can be inoculated according to the usual proportion in the field, such as mass ratio of 1:50~200. The fermentation temperature can be 23~34° C., and the fermentation time can be 22~35 hours.

In some embodiments, step 3) involves mixing the homogenate of *Gynostemma pentaphyllum* and sterile milk in a ratio of 0.25~0.65:1 and placing the mixed solution in a fermentation vessel; adding the activated Tibetan Kefir to the mixed solution in the fermentation vessel, and vibrating and fermenting at 23~34° C. for 22~35 hours.

According to the most preferred embodiment of the present invention, step 3) specifically involves mixing the homogenate of *Gynostemma pentaphyllum* and the sterile milk in a ratio of 0.65:1 and placing the mixed solution in a fermentation vessel; adding the activated Tibetan Kefir to the mixed solution in the fermentation vessel, and vibrating and fermenting at 28° C. for 28 hours. The response surface experiment of the present invention confirms that the fermented product has the highest in vitro ACE enzyme inhibitory activity under this condition.

The present invention also relates to a fermented milk of *Gynostemma pentaphyllum* prepared by the above method for fermenting. Without limitation, any fermented milk obtained through the aforementioned method or corresponding fermented milk products belong to the scope of rights of the present invention. These fermented milk products include, but are not limited to, any form of subsequent processing, packaging, etc. of the fermented milk, such as food, beverages, pharmaceuticals, etc., which may be of pharmaceutical or food grade.

The following are specific embodiments.

Example 1: Preparation Optimization of Homogenate of *Gynostemma pentaphyllum*

1) The *Gynostemma pentaphyllum* raw tea was crushed with a grinder, sieved with 100-mesh sieve, and added with purified water in a ratio of 1:10. Then the mixed solution was divided into several portions, respectively homogenized and leached at 25~60° C. for 0.5~2 hours.

2) The leached homogenate was centrifuged at 8000 g, and the supernatant was filtered with 0.22 µM membrane to analyze the content of *Gynostemma pentaphyllum* saponins. The content of *Gynostemma pentaphyllum* saponin was determined using HPLC, with *Gynostemma pentaphyllum* saponin XLIX and *Gynostemma pentaphyllum* saponin XVII as external standards for quantification. The liquid phase conditions were as follows: chromatographic column Shim-Pack C18 (4.6 mm×250 mm, 5 µm), flow rate of 1 mL/min, mobile phase: A water (0.1% formic acid), B acetonitrile (0.1% formic acid), elution conditions: 0 min, 35% B; 0~20 min, 35%~40% B; detection wavelength: 203 nm; injection volume 10 µL; and column temperature: 35° C.

Figure 1:
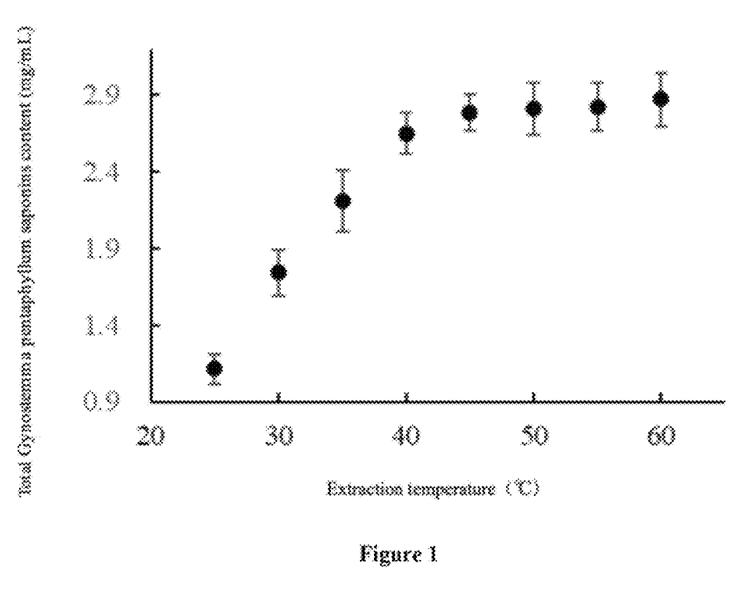
FIG. 1 shows the changes in total saponins of *Gynostemma pentaphyllum* with increasing temperature.

The results were shown in FIG. 1. The preparation of homogenate of *Gynostemma pentaphyllum* was evaluated using the total saponins of *Gynostemma pentaphyllum* as an indicator. As the temperature increases, the content of total saponins of *Gynostemma pentaphyllum* in the homogenate continuously increases. However, after the temperature exceeds 45° C., the increase in the extraction rate of *Gynostemma pentaphyllum* saponins slows down. Excessive temperature not only wastes energy, but also causes the homogenate of *Gynostemma pentaphyllum* to produce a cooked taste. Therefore, the preparation temperature of homogenate of *Gynostemma pentaphyllum* is 40~45° C., and the most preferable is 45° C.

Example 2: Optimization Activation of Tibetan Kefir

1) Activation step of Tibetan Kefir: The freeze-dried powder of Tibetan Kefir was placed in sterile milk and vibrated for cultivation at a temperature of 28° C. The mycelium of Tibetan Kefir was filtered and separated every 24 hours, and then transferred into fresh milk to make continuous culture. The culture lasted for 14 days.

2) Determination of fermentation activity of Tibetan Kefir: The volatile components in fermented milk were determined using gas chromatography-ion mobility spectroscopy to reflect the activity of Tibetan Kefir. 200 µL was sampled from the Tibetan Kefir cultivated with milk. 800 µL of water containing 3% sodium chloride was added into the sample, and vibrated for cultivation at 60° C. for 15 minutes. Then 0.3 mL of sample was injected by headspace. The gas chromatography conditions were as follows: the chromatographic column was se54 (15 m), and the flow rate gradient of the carrier gas was set to 2.00 mL/min for 2 minutes, linearly increased to 10.00 mL/min within 8 minutes, and linearly increased to 120.00 mL/min within 10 minutes for 15 minutes. The carrier gas and drift gas were both high-purity nitrogen.

Figure 2:
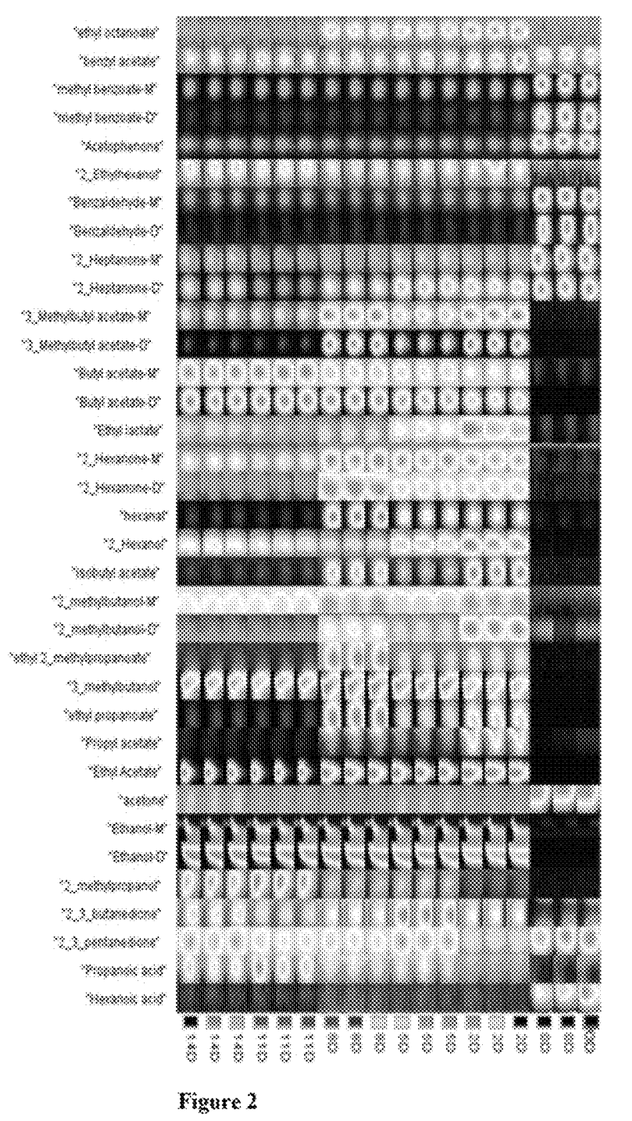
FIG. 2 evaluates the metabolic activity of Tibetan Kefir based on volatile aroma component indicators.

The results were shown in FIG. 2. 27 characteristic volatile compounds fermented by Tibetan Kefir were selected as indicators to reflect the degree of activation of Tibetan Kefir. From the second day of fermentation, the volatile components in the fermentation matrix milk began to increase, and the aroma components increased the most from the 5th to the 8th day. Then, the aroma components began to decrease. This indicates that during the cultivation process, the metabolic activity of Tibetan Kefir was most vigorous from the 5th to the 8th day, and then the metabolic activity of the Tibetan Kefir began to become monotonous. Therefore, in order to ensure the quality of the final product, it is chosen to use the mycelium of Tibetan Kefir activated by sterile milk for no more than 8 days as activating bacteria for the preparation of fermented milk of *Gynostemma pentaphyllum*.

Example 3: *Gynostemma pentaphyllum* Milk Fermented with Tibetan Kefir and Comparison of Total Saponin Content of *Gynostemma pentaphyllum* Therein 1) Preparation of fermented milk of *Gynostemma pentaphyllum*: The prepared homogenate of *Gynostemma pentaphyllum* was mixed with the sterile milk in a ratio of 0.25. Then the above mixed solution was added with the activated Tibetan Kefir mycelium, and vibrated and fermented at constant temperature for 24 hours at 28° C. After filtering, the fermented milk was sterilized using pasteurization.

2) Determination of *Gynostemma pentaphyllum* saponins in fermented milk: The same quality of *Gynostemma pentaphyllum* was crushed and added with 10 times the volume of water to prepare *Gynostemma pentaphyllum* tea soup. *Gynostemma pentaphyllum* tea soup and homogenate of *Gynostemma pentaphyllum* was respectfully added with milk matrix in a ratio of 0.25:1. The method in Example 1 was used to determine the total saponin content of *Gynostemma pentaphyllum* tea soup, the homogenate of *Gynostemma pentaphyllum*, and fermented milk respectively, to evaluate the effect of three methods on the release rate of total saponins of *Gynostemma pentaphyllum*.

Figure 3:
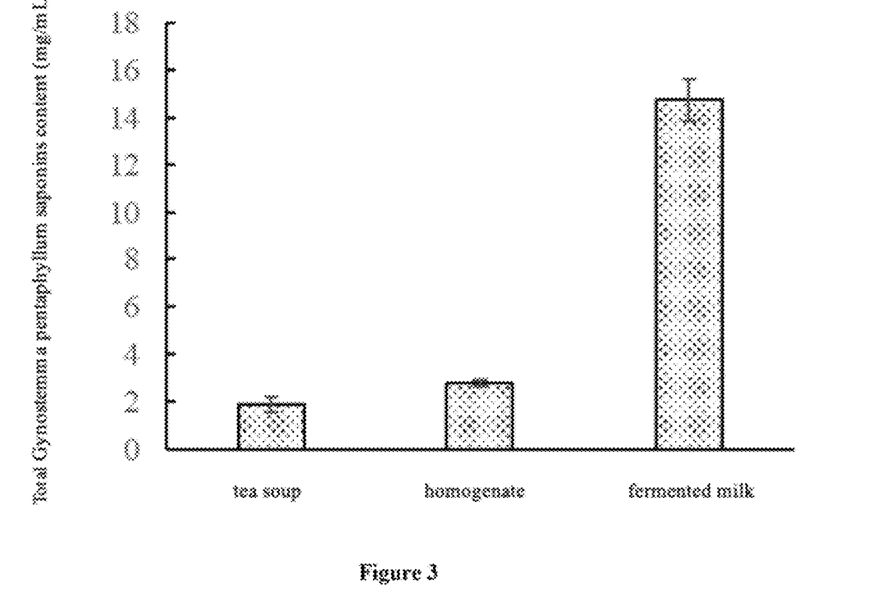
FIG. 3 shows the content of total saponins of *Gynostemma pentaphyllum* in the tea soup, homogenate, and the fermented milk of *Gynostemma pentaphyllum*.

The results were shown in FIG. 3: The fermentation with Tibetan Kefir can greatly increase the content of total saponins of *Gynostemma pentaphyllum*, indicating that fermented milk has better potential for lowering blood pressure.

Example 4: Optimization Conditions of Fermenting *Gynostemma pentaphyllum* Milk with Tibetan Kefir Selection of optimization conditions: The ratio of homogenate of *Gynostemma pentaphyllum* to milk (tea-milk ratio), fermentation time (t), and fermentation temperature (T) were selected as three factors to optimize the optimal fermentation conditions. The inhibitory activity of fermented milk on in vitro angiotensin converting enzyme (ACE) was used as an indicator for optimization. ACE, as a key enzyme for controlling blood pressure, can catalyze the production of angiotensin I to angiotensin II, leading to an increase in blood pressure. Inhibition of this enzyme activity can alleviate symptoms of hypertension and can be used as an evaluation indicator of the present invention. The inoculation amount of Tibetan Kefir accounted for 1/50 of the overall fermentation composition. The response surface experimental design was shown in Table 1.

TABLE 1

| Response Surface Experimental Design | | | |
|---|---|---|---|
| No. | Ratio | t | T |
| 1 | 0.55 | 8 | 35.0 |
| 2 | 0.10 | 48 | 27.5 |

TABLE 1-continued

| Response Surface Experimental Design | | | |
|---|---|---|---|
| No. | Ratio | t | T |
| 3 | 0.10 | 28 | 35.0 |
| 4 | 1.00 | 28 | 35.0 |
| 5 | 0.55 | 28 | 27.5 |
| 6 | 0.10 | 28 | 20.0 |
| 7 | 0.55 | 28 | 27.5 |
| 8 | 0.55 | 48 | 20.0 |
| 9 | 0.55 | 28 | 27.5 |
| 10 | 1.00 | 48 | 27.5 |
| 11 | 0.55 | 48 | 35.0 |
| 12 | 1.00 | 8 | 27.5 |
| 13 | 0.55 | 8 | 20.0 |
| 14 | 0.55 | 28 | 27.5 |
| 15 | 0.10 | 8 | 27.5 |
| 16 | 1.00 | 28 | 20.0 |
| 17 | 0.55 | 28 | 27.5 |

1) Determination of in vitro ACE inhibitory activity: pH of the sample to be tested was adjusted to 8.3 using borate buffer solution, was centrifuged at 10000 g, and 50 µL of the supernatant was taken. 50 µL of borate buffer solution (pH=8.3) with a concentration of 6.5 mM of horse urine acyl-histidine-leucine composition was mixed with the supernatant evenly, and added with 10 µL of ACE enzymes dissolved in the aforementioned borate buffer solution to initiate the reaction. After 30 minutes, the entire reaction system was inactivated at 95° C. for 5 minutes, and then an equal volume of methanol was added, filtered through 0.22 µm filter membrane, and used for liquid phase analysis of the amount of hippuric acid. The above reaction was repeated with borate buffer solution instead of the sample as control group. The liquid phase determination conditions are as follows: Hypersil GOLD (50×2.1 mm, 1.9 µm); mobile phase: 25% acetonitrile aqueous solution containing 0.1% trichloroacetic acid, flow rate of 0.3 ml/min; UV detection wavelength: 228 nm; Column temperature: 35° C.; Injection volume: 3 µL.

Figure 4:
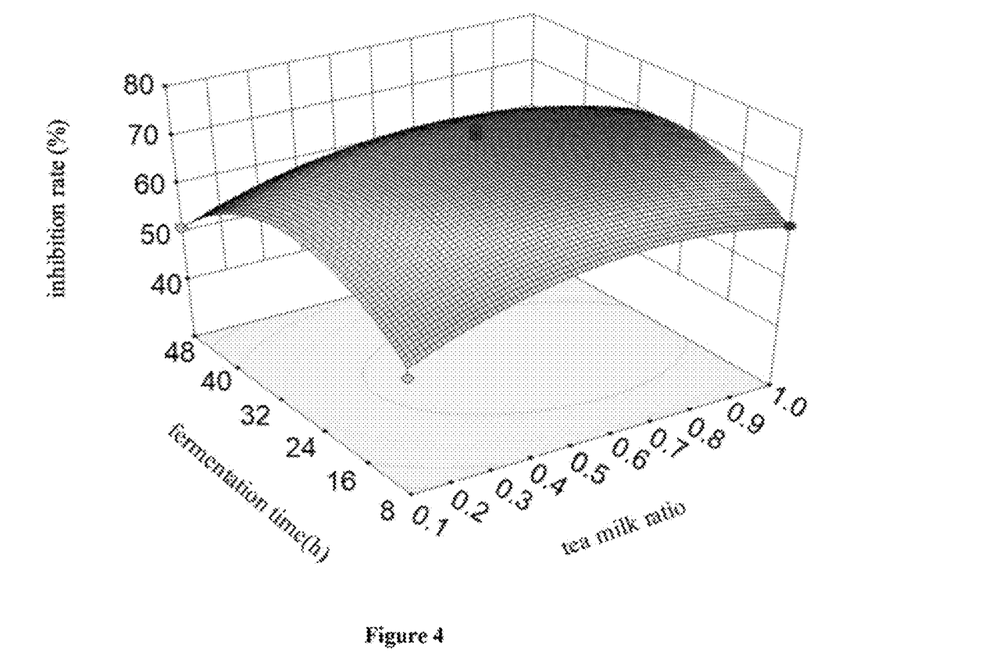
FIG. 4 shows response surface fitting results of the fermentation time and the ratio of the homogenate of *Gynostemma pentaphyllum* to the sterile milk.
Figure 5:
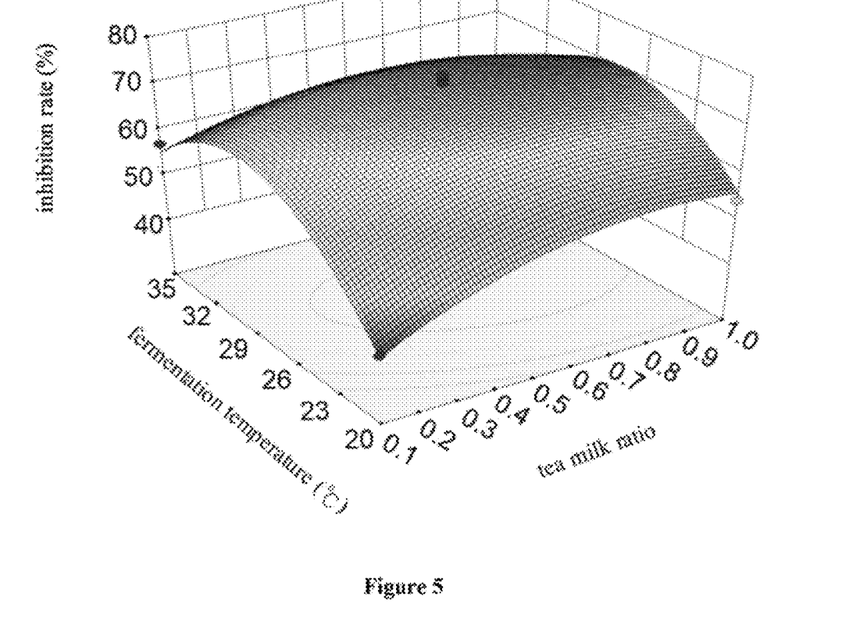
FIG. 5 shows response surface fitting results of the fermentation temperature and the ratio of the homogenate of *Gynostemma pentaphyllum* to the sterile milk.
Figure 6:
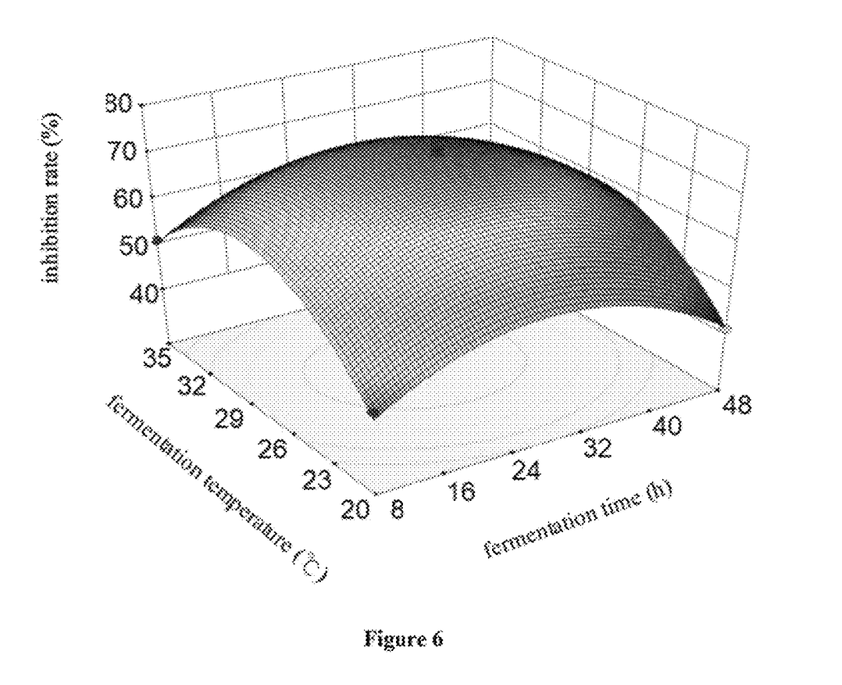
FIG. 6 shows response surface fitting results of the fermentation time and the fermentation temperature.
Figure 7:
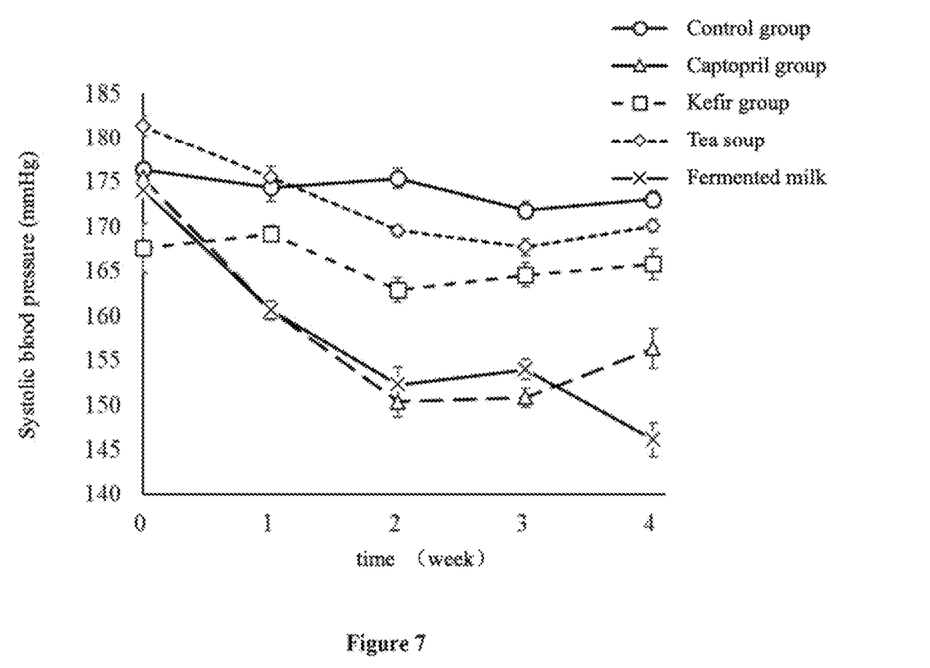
FIG. 7 evaluates the antihypertensive activity by measuring the blood pressure of tail artery of rats after 4 weeks of continuous intragastric administration.

The response surface fitting results are shown in Table 2 and FIG. 4, and the model is highly significant (Model p-value<0.0001), indicating that the response surface experiment is reasonable. Through response surface prediction, the optimal fermentation conditions are: Ratio=0.65, t=26.2, T=27.91. The model predicts that when the ratio of homogenate of *Gynostemma pentaphyllum* to milk is 0.65, fermentation at 27.91° C. for 26.2 hours can enable the maximum in vitro ACE enzyme inhibitory activity of the final product. Based on 60% inhibition rate, the fermentation temperature of 23~34° C. and the fermentation time of 22~35 hours all meet the fermentation requirements. In addition, considering that the proportion of homogenate of *Gynostemma pentaphyllum* is too high, the final product will have a strong "grassy" and astringent taste. At the same time, changing the proportion of homogenate of *Gynostemma pentaphyllum* and milk has a small impact on the in vitro ACE enzyme inhibitory activity. Therefore, a range of 0.31~1 is reasonable. A smaller proportion of homogenate of *Gynostemma pentaphyllum* is beneficial for the taste of the product, while a larger proportion of *Gynostemma pentaphyllum* milk can enhance the hypotensive activity of the product. Furthermore, considering the dynamic control needs of industrial production and the value-added rate of Tibetan Kefir, the fermentation temperature can be adjusted appropriately in actual production to shorten or extend the fermentation time, in order to improve product production efficiency or avoid overproduction. Therefore, the optimal conditions established by the present invention are: material liquid ratio 0.3-1, fermentation temperature 23~34° C., and fermentation time 22~35 hours. It can be understood that the conditions here do not limit the present application, and other parameters can also meet the basic requirements of this application.

TABLE 2

Response Surface Experimental Fitting Results

| Source | Sum of Squares | df | Mean Square | F Value | p-value Prob > F |
|---|---|---|---|---|---|
| Model | 2400.63 | 9 | 266.74 | 59.75 | <0.0001 |
| A-Ratio | 66.13 | 1 | 66.13 | 14.81 | 0.0063 |
| B-t | 32 | 1 | 32 | 7.17 | 0.0317 |
| C-T | 55.13 | 1 | 55.13 | 12.35 | 0.0098 |
| AB | 4 | 1 | 4 | 0.9 | 0.3754 |
| AC | 72.25 | 1 | 72.25 | 16.18 | 0.005 |
| BC | 4 | 1 | 4 | 0.9 | 0.3754 |
| A^2 | 171.12 | 1 | 171.12 | 38.33 | 0.0004 |
| B^2 | 671.12 | 1 | 671.12 | 150.33 | <0.0001 |
| C^2 | 1129.01 | 1 | 1129.01 | 252.9 | <0.0001 |
| Residual | 31.25 | 7 | 4.46 | | |
| Lack of Fit | 21.25 | 3 | 7.08 | 2.83 | 0.1701 |
| Pure Error | 10 | 4 | 2.5 | | |
| Cor Total | 2431.88 | 16 | | | |

Example 5: Animal Experiments for Confirming the Antihypertensive Activity of *Gynostemma pentaphyllum* Milk Fermented with Tibetan Kefir Spontaneous hypertension rats (SHR) were selected as animal models, were divided into five groups, and every nine rats served as a group, namely, the control group of normal saline, the positive control group of captopril, the commonly used antihypertensive drug, the kefir group of fermented milk with Tibetan Kefir, the group of unfermented *Gynostemma pentaphyllum* tea soup and the group of *Gynostemma pentaphyllum* fermented milk with Tibetan Kefir. Each rat was given 2 mL volume of liquid by gavage each time, wherein, the concentration of captopril group was 10 mg/kg; *Gynostemma pentaphyllum* tea soup was prepared by soaking at 45° C. for 1 hour with a material liquid ratio of 1:10, and cooled to room temperature; *Gynostemma pentaphyllum* fermented milk was prepared by mixing and the same *Gynostemma pentaphyllum* tea soup as the former and sterile milk at a ratio of 0.65:1, inoculating with 2% Tibetan Kefir, fermenting at 28° C. for 24 hours. All rats were by gavage continuously for 4 weeks, and the blood pressure of tail artery was measured to evaluate the antihypertensive activity.

Result: The blood pressure of SHR in the control group is always high. The blood pressure of SHR by gavage with the fermented milk of *Gynostemma pentaphyllum* has obviously decreased, and the blood pressure reduction range is similar to that of SHR by gavage with antihypertensive drugs. In addition, the blood pressure of SHR by gavage with Tibetan Kefir fermented milk (kefir) without homogenate of *Gynostemma pentaphyllum* and the blood pressure of SHR by gavage with *Gynostemma pentaphyllum* tea soup do not decrease significantly. The above results indicate that *Gynostemma pentaphyllum* milk fermented with Tibetan Kefir has good hypotensive effect, and the effect can reach the level of commercial antihypertensive drugs, which exceeds the experimental expectations.

The aforementioned description of the specific exemplary embodiments of the present invention is for the purpose of illustration and exemplification. These descriptions are not intended to limit the present invention to the precise form disclosed, and it is evident that many changes and variations can be made based on the above teachings. The purpose of selecting and describing exemplary embodiments is to explain the specific principles and practical applications of the present invention, so that those skilled in the art can implement and utilize various exemplary embodiments of the present invention, as well as various choices and changes. The scope of the present invention is intended to be limited by the claims and their equivalent forms.

The invention claimed is:

1. A method for fermenting *Gynostemma pentaphyllum* with Tibetan kefir, comprising the steps of:
   1) pretreatment of *Gynostemma pentaphyllum*: crushing *Gynostemma pentaphyllum* raw tea and homogenizing it with water at 40~45° C. to prepare a homogenate;
   2) activation of Tibetan kefir: activating Tibetan kefir in sterile milk comprising vibrating and fermenting Tibetan kefir in the sterile milk, and continuously culturing for no more than 8 days until the Tibetan kefir is fully activated; and
   3) fermentation of *Gynostemma pentaphyllum*: fermenting the homogenate of *Gynostemma pentaphyllum*, the sterile milk, and the activated Tibetan kefir comprising mixing the homogenate of *Gynostemma pentaphyllum* and the sterile milk in a ratio of 0.3-1:1, and inoculating the activated Tibetan kefir in a mass ratio of 1:50~200, with a fermentation temperature of 23~34° C. and a fermentation time of 22~35 hours.

2. The method for fermenting *Gynostemma pentaphyllum* with Tibetan kefir according to claim 1, wherein, in the step 3) the homogenate of *Gynostemma pentaphyllum* and the sterile milk are mixed in a ratio of 0.3-1:1, and placing mixture in a fermentation vessel; adding the activated Tibetan kefir to the mixture in the fermentation vessel, and vibrating and fermenting at 23~34° C. for 22~35 hours.

3. The method for fermenting *Gynostemma pentaphyllum* with Tibetan kefir according to claim 1, wherein, in the step 1) *Gynostemma pentaphyllum* raw tea is crushed and then homogenized with 5~10 times the volume of water at 40~45° C. for 0.5~2 hours, and filtering for later use.

4. The method for fermenting *Gynostemma pentaphyllum* with Tibetan kefir according to claim 1, wherein, in the step 2) taking the Tibetan kefir, vibrating and fermenting it in the sterile milk at 26~28° C., filtering and transferring mycelium of Tibetan kefir to new milk once every 20~26 hours, and cultivating for 5~8 days until strain is fully activated.

5. A fermented milk of *Gynostemma pentaphyllum*, which is prepared by using the method for fermenting according to claim 1.

6. A food composition comprising the fermented milk of *Gynostemma pentaphyllum* according to claim 5.

7. An application of Tibetan kefir in preparing fermented milk of *Gynostemma pentaphyllum* by fermentation, wherein, the fermentation is mixed fermentation of *Gynostemma pentaphyllum*, milk, and Tibetan kefir, comprising the following steps:
   1) pretreatment of *Gynostemma pentaphyllum*: crushing *Gynostemma pentaphyllum* raw tea to prepare a homogenate;
   2) activation of Tibetan kefir: activating Tibetan kefir in sterile milk;
   3) fermentation of *Gynostemma pentaphyllum*: fermenting the homogenate of *Gynostemma pentaphyllum*, sterile milk, and the activated Tibetan kefir;

step 1) is as follows: crushing the *Gynostemma pentaphyllum* raw tea and homogenizing it with water at 40~45° C. to prepare a homogenate;

step 2) is as follows: taking the Tibetan kefir, vibrating and fermenting it in the sterile milk, and continuously culturing for no more than 8 days until the strain is fully activated; and step 3) is as follows: mixing the homogenate of *Gynostemma pentaphyllum* and the sterile milk in a ratio of 0.3-1:1, and inoculating the activated Tibetan kefir in a mass ratio of 1:50~200, with a fermentation temperature of 23~34° C. and a fermentation time of 22~35 hours.

* * * * *